United States Patent

[11] 3,620,279

| [72] | Inventors | Zoltan Bartha;<br>Laszlo Vad; Imre Biro; Otto Farkas, all of<br>Budapest, Hungary |
|------|-----------|---|
| [21] | Appl. No. | 841,738 |
| [22] | Filed | July 15, 1969 |
| [45] | Patented | Nov. 16, 1971 |
| [73] | Assignee | Orszagos Gumiipari Vallalat<br>Budapest, Hungary |

[54] PNEUMATIC TIRES
3 Claims, 2 Drawing Figs.

| [52] | U.S. Cl. | 152/356, 152/361 |
|------|----------|------------------|
| [51] | Int. Cl. | B60c 9/02 |
| [50] | Field of Search | 152/354, 356, 361 |

[56] References Cited
UNITED STATES PATENTS

| 3,233,649 | 2/1966  | Jolivet et al. | 152/361   |
|-----------|---------|----------------|-----------|
| 3,068,926 | 12/1962 | Jacob et al.   | 152/354   |
| 2,348,350 | 5/1944  | McKelvey       | 152/361 X |
| 1,165,631 | 12/1915 | Seward, Jr.    | 152/354   |

FOREIGN PATENTS

| 787,705 | 12/1957 | Great Britain | 152/356 |

Primary Examiner—Arthur L. La Point
Assistant Examiner—George H. Libman
Attorney—Spencer & Kaye ABSTRACT: In order to improve diagonal-ply tires one or more zone plies which do not extend further than the limit of the flexible zone, are employed together with cord elements with certain limits of the cord angle which are determined by the shaping angle and by the direction of the cord elements.

PATENTED NOV 16 1971 3,620,279

INVENTORS:
Zoltán Bartha
László Vad
Imre Biró
Ottó Farkas

BY Spencer & Kaye

ATTORNEYS

PNEUMATIC TIRES

This invention relates to pneumatic tires.

The utility of pneumatic tires is, in general, determined by three factors, namely the maximum loading capacity of the tire, the maximum speed the tire can endure, and the durability of the tire.

The loading capacity of a tire is a function of the footprint area of the tire on the road surface and the air pressure inside the tire. Large motor vehicles require tires having a large footprint surface area and a high air pressure, for example 5–7 atmospheres. Increases in tire air pressure require corresponding increases in the strength of the tire carcass, i.e., the number of plies in the carcass must be increased.

However, the ability to increase the number of plies in the tire carcass is limited by stress caused by flexing of the tire, and by the degree of tire heat buildup when a vehicle is at its maximum speed.

At a given load or given speed, the tire heat buildup properties—the so-called critical temperature—limit the possibility of augmenting one or the other of these requirements. In other words, if the critical temperature in practical use is exceeded any limitation becomes necessary. Hitherto, such an equalization has only been possible by a compromise and any increase in the loading capacity has had to be balanced by a speed decrease, or, alternatively, any increase of vehicle speed has had to be balanced by a decrease of loading capacity.

The construction of pneumatic tires has to be such that the tires can endure the load well. There are two main types of tire construction, namely those resulting in diagonal-ply tires and those resulting in radial-ply tires.

At present, the majority of tires are manufactured according to the diagonal carcass method. The essential feature of diagonal-ply tires is that the cords bearing the load in the tire carcass are placed in the direction—or near to the direction—of the total of power stress vectors, lying in the direction of the travel and in the direction conceived perpendicularly thereon. The diagonal carcass generally comprises an even number of plies and cord elements therein are disposed at an acute angle with respect to the direction of travel of the tire. The plies extend from tire bead to tire bead and the cord elements in successive plies alternatively cross each other. In such diagonal-ply tires, the crown angle is acute and its value generally is from 30° to 46°. In practice, that form of construction is generally used where the ends of the plies lie closely over or beside the bead wires or are bent back around them. The diagonal-ply tires may comprise—besides full plies—on the outer (between the tread and the carcass) side of the carcass one or two so-called breakers.

It is typical for diagonal-ply tires from the point of view of strength, that the strength of the carcass is ensured by the same number of plies on the entire circumference of its profile, i.e., both under the tread (crown) and in the flexing zone (in the sidewalls).

The rapid growth of the motorcar industry and of the traffic has caused a continual demand for pneumatic tires, which are capable of bearing ever greater loads and traveling at ever higher speeds than hitherto. The diagonal-ply pneumatic tires are not suitable for meeting this demand due to the limits set by the aforesaid heat buildup.

Radial-ply tires are now becoming more and more frequently used. In radial-ply tires, the load-carrying cords of the plies in the carcass, which may be of a textile material or of steel, are situated in the direction of the vectors themselves. The carcass of the tire is constructed: (1) partly of two or more plies bent under the bead wires, the cord elements therein forming an angle of 90°, or, approximately 90°, with respect to the crown line of the tire and (2) partly of a belt composed of two or more layers inserted between the tread and the aforesaid plies, the layers being not wider than the tread and the cords therein being disposed parallel with respect to the crown line of the tire, or at a very little acute angle 5°–18°), with respect to the crown line. The wider spread of radial tires is, however, handicapped by the requirement for special and sophisticated producing equipments, and by the limited use of the tires due to the need for better roads.

Several attempts have been made to overcome the mentioned disadvantages, both to overcome the disadvantages of radial tires and to manufacture diagonal-ply tires to satisfy recent demands. Such attempts have been carried out especially with the aim of increasing the use-value of diagonal-ply tires utilizing the diagonal construction principles and manufacturing techniques.

The present invention aims to increase the use-value of diagonal-ply pneumatic tires by applying the plies according to the diagonal construction principle, however, not with equal strength alongside the entire circumference of the tire profile, but differentiated into zones, taking into account the differences of stress to which each zone is exposed. Thus the strength of the tire crown zone is increased as compared to the flexed zone (sidewalls). The invention also aims to provide a diagonal-type pneumatic tire which has an increased working capacity.

We have found that zone plies or zone-ply pairs with a diagonal cord direction, disposed in the tire crown zone between the diagonal plies reaching from bead to bead, exhibit the same performance against all kinds of stress affecting the crown zone as the whole diagonal plies or ply pairs.

Accordingly, this invention provides a pneumatic tire of diagonal construction having under the tread between plies or ply pairs which extend between tire beads, one or more zone plies which do not extend farther than the flexing zone of the tire. These cord elements disposed in a diagonal direction forming an acute angle in respect to the crown line, the lower limit of the cord element angle being determined by the shaping angle, and the upper limit being determined by the direction of the cord in the adjacent full plies.

The invention makes it possible to construct pneumatic tires, for usual performance with a decreased number of full plies, and for increased use value, with the same number of full plies and in both cases with simultaneously applied zone plies.

The pneumatic tires of the present invention have in the tread zone of the carcass one or more zone plies with cord elements placed diagonally therein, and with equal strength to that of the full plies. These zone plies extend at most as far as the flexing zone and are enclosed on both sides by the full plies.

The zone plies are preferably places in pairs in between one or more full-ply pairs. The edges of the zone plies may be arranged in a steplike formation.

It has been stated that by applying the same degree of cord inclination, every single zone ply performs the breaking strength, or the breaking work of one full ply. It may be further stated that if the angle of the cords in the zone plies is decreased, the breaking strain in the tread area and in consequence of this the breaking work will be greater.

The angle of the zone plies can essentially be decreased to that point where it does not interfere with shaping of the tire prior to curing and during the cure. This angle may be from 25°–30.

This invention will now be described by way of example with reference to the accompanying drawings, in which.

Figure 1:
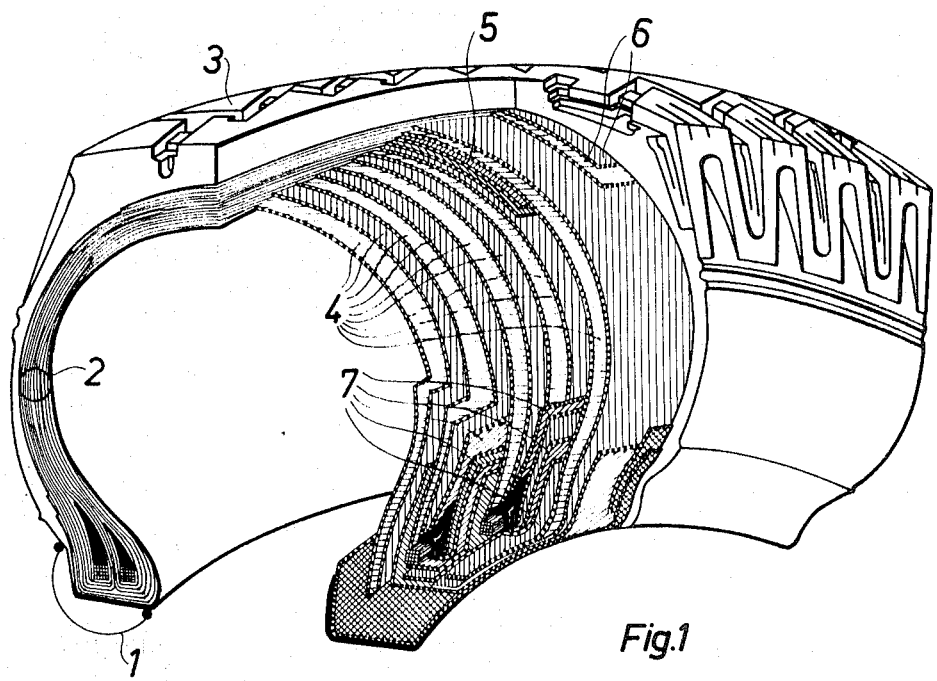
FIG. 1 is a cross-sectional view of a carcass of a truck-size high-speed pneumatic rubber tire.

Referring to FIG. 1, the tire has beads 1, sidewalls (or flexing zone) 2 and a tread or crown zone 3. The tire carcass is composed of 10 pieces of diagonal plies 4, extending from bead to bead, and of a two-piece zone ply 5 placed between the fourth and fifth ply pair counted from the inside, under the tread. The carcass includes a breaker 6, and bead-wrapping (chafer) fabrics 7. In FIG. 1, the alternating direction of the cord elements of the full plies, as well as that of the zone plies, is shown. The strength of the tread zone of the shown tire is equivalent to that of a traditionally built 12-ply tire.

Figure 2:
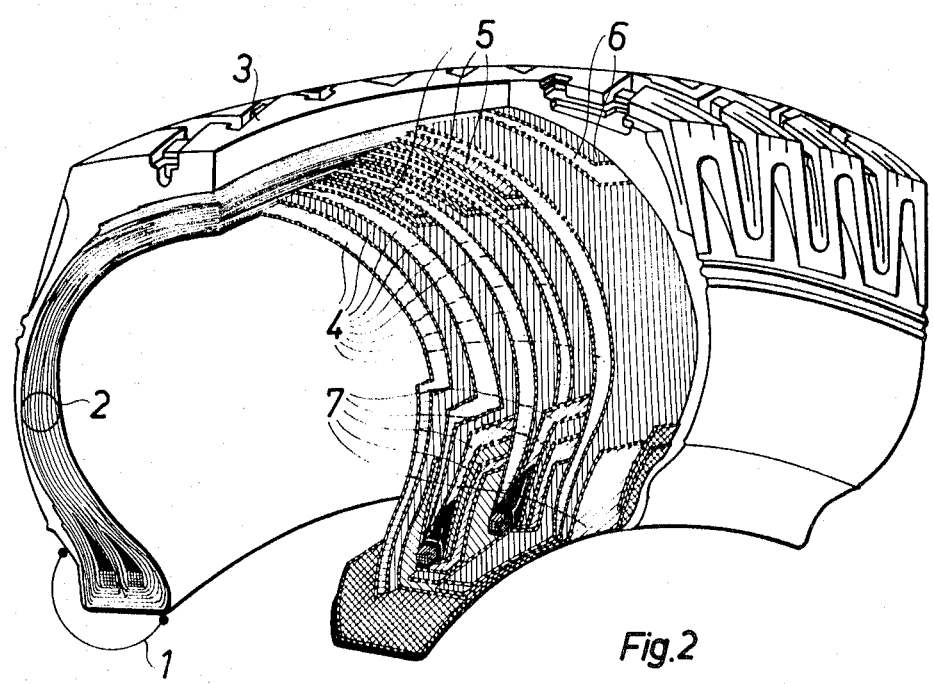
FIG. 2 is a cross-sectional view of a carcass of a rubber tire, having a high loading capacity for use under unfavorable road conditions.

Referring to FIG. 2, the tire has beads 1, sidewalls 2 and a tread zone 3. The tire is composed of 10 full plies 4, six zone plies 5, a breaker 6 and bead-wrapping (chafer) fabrics 7. The six zone plies 5 are disposed in pairs between the second and third, the third and fourth, and the fourth and fifth full plies counted from the inner side of the tire towards the outer side. Both the full and the zone plies are arranged in such a manner that the cord elements cross each other in successive plies. The tread zone of the tire is of equivalent strength to that of a traditional 16-ply rubber tire.

The pneumatic tires of the present invention may have considerable advantages, both from the technical and economical point of view. They may enable the attainment of an increase of strength in the crown zone of the tires without a consequent increase in the thickness of the tire sidewalls, thus avoiding the disadvantageous increase of the hitherto mentioned tendency of the tire to heat up. Also, the pneumatic rubber tires of this invention can be produced with conventional equipments, thus avoiding the need for any new investments. Furthermore, the tires may have an abrasion resistance that is greater than that of traditional diagonal-ply tires.

We claim:

1. In a pneumatic tire carcass having a crown zone portion, end beads, and a flexing zone portion therebetween, which carcass comprises a plurality of overlapping plies that extend from tire bead to tire bead, and cord elements in successive plies crossing each other and disposed at an acute angle with respect to the centerline of the crown zone portion, the improvement comprising at least one additional pair of plies disposed between pairs of adjacent overlapping plies in the portion of the carcass which is below the crown zone portion, the side edges of said additional pair of plies extending no further than to the limit of the flexing zone portion, the plies of said additional pair of plies being in direct contact with each other along the entire facing surfaces thereof and having cord elements disposed in a direction forming an acute angle of between 30° to 46° with respect to the centerline of the crown zone, and said cord elements in said additional pair of plies crossing each other.

2. The improvement as in claim 1, wherein said additional pair of plies is disposed between a pair of adjacent overlapping plies.

3. The improvement as in claim 1, wherein said additional pair of plies is disposed between at least two pairs of the adjacent overlapping plies.

* * * * *